United States Patent [19]

Kim et al.

[11] Patent Number: 5,369,189

[45] Date of Patent: Nov. 29, 1994

[54] PROCESS FOR THE PREPARATION OF HEAT RESISTANT AND TRANSPARENT ACRYLIC RESIN

[75] Inventors: Jin B. Kim, Youseong-gu; Young S. Hur, Seo-gu, both of Rep. of Korea

[73] Assignee: Lucky, Ltd., Seoul, Rep. of Korea

[21] Appl. No.: 773,896

[22] PCT Filed: Dec. 28, 1990

[86] PCT No.: PCT/KR90/00023

§ 371 Date: Jun. 8, 1992

§ 102(e) Date: Jun. 8, 1992

[87] PCT Pub. No.: WO91/09886

PCT Pub. Date: Jul. 11, 1991

[30] Foreign Application Priority Data

Dec. 29, 1989 [KR] Rep. of Korea ............... 89-20194
Dec. 30, 1989 [KR] Rep. of Korea ............... 89-20345
Aug. 13, 1990 [KR] Rep. of Korea ............... 90-12452
Aug. 13, 1990 [KR] Rep. of Korea ............... 90-12453
Aug. 13, 1990 [KR] Rep. of Korea ............... 90-12454

[51] Int. Cl.$^5$ ............................................. C08F 8/32
[52] U.S. Cl. ............................ 525/378; 525/379.9; 525/330.5; 525/380
[58] Field of Search ............................... 525/378, 380

[56] References Cited

U.S. PATENT DOCUMENTS

| | | | |
|---|---|---|---|
| 2,146,209 | 2/1939 | Graves | 525/380 |
| 3,284,425 | 11/1966 | Schroder et al. | 525/380 |
| 4,246,374 | 1/1981 | Kopchik | 525/379 |
| 5,096,976 | 3/1992 | Sasaki et al. | 525/379 |
| 5,225,496 | 7/1993 | Yammamoto et al. | 525/379 |

*Primary Examiner*—Bernard Lipman
*Attorney, Agent, or Firm*—Morgan & Finnegan

[57] ABSTRACT

The present invention relates to a process for the preparation of heat resistant and transparent acrylic resin which is characterized by imidizing methacrylic resin in a solution with primary amine or the ammonia compounds generating primary amine in the presence or absence of catalyst and under a suitable temperature condition. The reaction product is the compound of formula (I) comprising more than 10% by weight of imidized structure unit. Formula (I) wherein $R_1$, $R_2$ and $R_3$ independently represent a hydrogen atom, or unsubstituted and substituted $C_1$ to $C_{20}$ alkyl, cycloalkyl, aryl, aralkyl, alkaryl, or mixtures thereof.

12 Claims, No Drawings

PROCESS FOR THE PREPARATION OF HEAT RESISTANT AND TRANSPARENT ACRYLIC RESIN

DETAILED DESCRIPTION OF THE INVENTION

The present invention relates to a process for the preparation of heat resistant and transparent acrylic resin. More particularly, it relates to a process for the preparation of transparent acrylic resin which is improved in heat resistance by introducing imide structure into acrylic polymers in the presence or absence of a catalyst.

Up to date, since methylmethacrylate resin has had good transparency, weatherability and mechanical properties, it has been used in highly efficient optical materials, decorative materials, automobiles and electric products. However, having low heat deflection temperature of less than 100° C., methylmethacrylate resin has not been used in the field of requiring heat resistance. Therefore, we have required its heat resistance improved.

As a general the method to improve the heat resistance of acrylic resin is as follows:

1. the method of heating react acrylic acid, methacrylic acid or their ester polymer with a primary amine in the solvent having high boiling point (U.S. Pat. No. 2,146,209), 2. the method of reacting methylmethacrylate polymer with primary amine in the presence of water (U.S. Pat. No. 3,284,425), 3. the method of reacting acrylic polymer with anhydrous ammonia or anhydrous primary amine in a extruder (U.S. Pat. No. 4,246,374), and 4. the method reacting methacrylate resin with anhydrous ammonia or anhydrous primary amine in the presence of a solvent (JP 63-36696).

According to the above-mentioned method (1), it is difficult to separate solvents completely from the imidized polymer product on a commercial scale, because the boiling point of the solvent is high. Therefore, since the obtained imidized polymer is colored, the transparency of final product is deteriorated.

Also, as the imidiazation reaction according to the above-mentioned method (2) is carried out by using a great quantity of water as a dispersion medium, water phase and polymer phase are separated. Accordingly, it is difficult to obtain uniform imidized polymer. As the reaction is carried out at higher than the softening temperature of acrylic polymer, reaction product coagulates around agitator and handling of the reaction product is difficult.

Also, according to the above-mentioned method (3) it is difficult to obtain uniform imidized polymers, because polymers having high viscosity are reacted with gaseous primary amines.

Also, according to the above-mentioned method (4), it is required to remove moisture from acrylic polymers, solvents and amines in order to prevent hydrolysis.

Therefore, the present inventors investigated a process assiduously to improve the above-mentioned problems. We could produce acrylic resin having heat resistance and transparency through the following methods.

The object of the present invention is to provide a process for the preparation of acrylic resin which has excellent heat resistance and transparency and maintains all of the good original characteristics of acrylic resin by selecting the suitable solvent dissolving both reactants and products.

The other object of the present invention is to provide a process for the preparation of acrylic resin which has excellent heat resistance and transparency by adding some water together with a suitable solvent into a reaction system.

The another object of the present invention is to provide a process for the preparation of acrylic resin which has excellent heat resistance and transparency by adding a catalyst and a suitable solvent to reaction system, and using ammonium bicarbonate or their derivatives as a imidizing agent.

The another object of the present invention is to provide a process for the preparation of acrylic resin which has excellent heat resistance and transparency by adding catalyst in the presence of a suitable solvent and pouring some water into the reaction system.

The another object of the present invention is to provide a process for the preparation of acrylic resin which has excellent heat resistance and transparency by adding catalyst to the reaction system in the presence of a suitable solvent and under anhydrous condition when methacrylate polymer and ammonia compound are reacted.

THE DETAILED DESCRIPTION OF THE PRESENT INVENTION IS AS FOLLOWS

The present invention is a process for the preparation of a heat resistant and transparent acrylic polymers which is characterized by heating acrylic resin in a suitable solvent with ammonia, primary amine or the ammonia compounds generating ammonia or primary amine under a suitable temperature condition and in presence or absence of catalyst. Namely, poly(methyl methacrylate) (PMMA) reacts with ammonia compounds generating primary amine such as ammonium bicarbonate or their derivates of the formula (II) in the presence of solvent at 180°~350° C. in order to introduce imide structure into PPMA. Consequently, the obtained methacrylimide group containing polymer of the formula (I) comprises more than 10% by weight of imidized structure unit, preferably, more than 20% by weight.

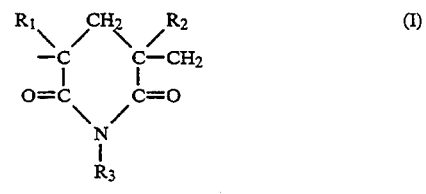

(I)

$RNH_3HCO_3$      (II)

wherein $R_1$, $R_2$ and $R_3$ independently represent a hydrogen atom, or unsubstituted and substituted $C_1$ to $C_{20}$ alkyl, cycloalkyl, aryl, aralkyl, alkaryl, or mixtures theirof.

Methacrylimide group containing polymer of the present invention is what introduces methacrylimide (dimethylglutarimide) structure into the side chain of acrylic resin. Wherein acrylic polymers introducing imide structre are methylmethacrylate polymer and methylmethacrylate-ethylenic unsaturated monomer copolymer, in which methacrylic acid ester, acrylic acid ester, styrene or α-methylstyrene or maleic anhydride is used as a ethylenic unsaturated monomer.

Methacrylic resin used in producing methacylic copolymer is preferably methylmethacrylate homopolymer, methylmethacrylate-methylacylate copolymer, methylmethacylate-styrene copolymer, and methylmethacyhate-styrene-maleic anhydride copolymer.

Though the amount of methylmethacylate structure unit comprised in the above-mentioned copolymer is not fixed, it is preferably at least 50% by weight.

Methacrylic acid ester is methylmethacrylate, ethylmethacrylate, propylmethacrylate, n-butylmethacrylate, isobutylmethacrylate, t-butylmethacrylate, cyclohexyl methacrylate, benzyl methacrylate, arylmethacrylate and the likes. Acrylic acid ester is methylacrylate, ethylacrylate, propylacrylate, n-butylacrylate, isobutyl acrylate, t-butylacrylate, cyclohexylacrylate, benzylacrylate, arylacrylate and the likes. PMMA among the esters is preferable from a transparent and imidiazation reactionary point of view.

The solvent used in the present invention should not obstruct the imidization reaction. Moreover, the solvent which can dissolve both acrylic polymers and imidized products is essentially required. Also, if the boiling point of a solvent were pretty high, it would be to difficult removed a solvent after reaction. Oppositely, if the boiling point of a solvent were pretty low, the pressure would rise, therefore, the boiling point of the solvent is preferably $50° \sim 160°$ C.

The solvent dissolving methylmethacrylate polymer is preferably aromatic hydrocarbon compounds such as benzene, toluene and xylene etc., ketones such as methylethyl ketone, ethers such as ethyleneglycol dimethylether, diglyme, dioxane and tetrahydrofuran, alcohols such as methyl alcohol, ethyl alcohol, isopropyl alcohol and butyl alcohol, dimethylformamide, dimethylsulfoxide and dimethylacetamide etc.. The solvent may be used in single or mixed type.

On the one hand the primary amine of the following formula (III) of imidizing agent to imidize methylmethacrylate polymer is ammonia, methyl amine, ethyl amine, n-propyl amine, n-butyl amine, heptyl amine, hexyl amine, cyclohexyl amine, octyl amine, nonyl amine, decyl amine, dodecyl amine, hexadecyl amine, octadecyl amine, isobutyl amine, sec-butyl amine, t-butyl amine, isopropyl amine, 2-ethylhexyl amine, 2-phenylethyl amine, aryl amine, alanine, benzylamine, parachlorobenzylamine, dimethoxphenylethyl amine, aniline, bromoaniline, dibromoanilin, tribromoaniline, chloroaniline, dichloroaniline and trichloroaniline, the compound are gaseous or liquid state when the above reaction is carried out. The solid ammonium bicarbonate or their derivatives of the formula (III) may be used simply and the handling of the compound is easy industrially.

$$RNH_2 \qquad (III)$$

wherein R represents a hydrogen atom, or unsubstituted and substituted $C_1$ to $C_{20}$ alkyl, cycloalkyl, aryl, aralkyl, alkaryl, or mixtures theirof.

The temperature to react methylmethacrylate resin with imidizing agent is preferably $180° \sim 350°$ C., more preferably, $200° \sim 300°$ C. If, the reaction temperature exceeded 350° C. methylmethacrylate polymer decomposed. Oppositely, if the reaction temperature were less than 180° C., the reaction rate remarkablely decreases so that the imidization process takes a long time.

Also, the present invention is a process for the preparation of the methacrylimide group containing polymer that methacrylic resin is reacted with primary amine or the compounds generating primary amine of the formula (III) in the presence of a suitable solvent at $180° \sim 350°$ C. by adding 5 to 20% by weight of water as an imidization reaction promoter. The amount the imide structure unit among the above polymer is more than 10%, preferably more than 20%.

We found that one of the reaction promoter used in the present invention is water. If the suitable amount of water was added to the reaction system, it operated as a catalyst and the reaction is well carried out.

The present invention has advantages that improved heat resistance is obtained by increasing the degree of the imidization in the presence of a suitable amount of water. Moreover, since water increases the solubility in reaction system, reactivity of imidization reaction is increased in the case that ammonia compounds generating primary amine is used. Accordingly, when methylmethacrylimide polymer is produced, 5 to 20% by weight of water, desirably, 7 to 15% by weight is added to reaction system.

In the case that the amount of water is less than 5% by weight, heat resistance is decreased by decreasing reactivity. Oppositely, in the case that the amount of water is more than 20% by weight, heterogeneous imidized polymer is obtained by separating water phase and polymer phase, and the products are coagulated around reactor axis.

Also, the present invention is a process for the preparation of methacrylimide group containing polymer that acylic resin is reacted in the presence of suitable solvent with ammonium bicarbonate or their derivatives at $100° \sim 350°$ C. by adding 0.01 to 15% by weight of tetraalkylammonium hydroxide of the formula (IV). The polymer comprise more than 5% by weight of methacrylimide group.

$$R_4NOH \qquad (IV)$$

wherein R represents a hydrogen atom, or unsubstituted and substituted $C_1$ to $C_{20}$ alkyl, cycloalkyl, aryl, aralkyl, alkaryl, or mixtures theirof.

Reactions and reaction temperature are the same as the above-mentioned.

The catalyst used in the reaction is desirably tetraalkylammonium hydroxide, such as tetramethylammonium hydroxide pentahydrate, tetraalkylammonium hydroxide. Since tetraalkylammonium hydroxide is operated as a basic catalyst in reaction system, the degree of imidization is increased. Improved transparent and heat resistant acylic resins may be produced because reaction condition (e.g. reaction temperature and pressuare) is miled. Besides, tetraalkylammonium hydroxide is decomposed into trialkyl amine and alcohol by heating, it is easily separated from polymer products.

When methylmethacrylimide polymer is produced, the amount of tetraalkylammonium hydroxide is preferably 0.01 to 15% by weight, more desirably, 0.1 to 7% by weight. If the amount of tetraalkylammonium hydroxide is less than 0.01% by weight, catalytic effect is not significant. Oppositely, if the above-mentioned amount is more than 15% by weight, the material properties of products are deteriorated.

Also, the present invention is a process for the preparation of methacylimide group containing polymer that acrylic resin is reacted in the presence of a suitable solvent with primary amine or the compounds generating primary amine at $100° \sim 350°$ C. by adding 0.01 to 15% by weight of tetraalkylammonium hydroxide of the above-mentioned formula (IV) and 5 to 20% by weight of water. The polymer comprises more than 5% by weight of methacrylimide.

The present invention is a process of the preparation of methacrylimide group containing polymer, namely, acrylic resin is reacted in the presence of a suitable solvent with ammonia or primary amine or the ammonia compounds generating ammonia or primary amine at 100°~350° C. and under the anhydrous condition by adding tetraalkylammonium hydroxide of the above-mentioned formula (IV) as a catalyst. Wherein the amount of methacrylimide group comprised in the polymer is more than 5% by weight. This reaction condition is the same as the above-mentioned except using catalyst under the anhydrous condition.

The acrylic resin obtained in the present invention has characteristics that heat resistance and transparency are excellently improved and maintains original good optical and mechanical properties, weatherability, molding processibility and productivity.

The material properties of the polymer according to the present invention were measured in compliance with followings.

1. the confirmation of imidization of the polymer

It is measured with potassium bromide (KBr) pellet by using infrared spectrometer (BIORAD, FTIR).

2. the degree of imidization of polymer (%)

It is measured by the amount of nitrogen measured by elementary analysis (PERKIN ELMER MODEL: 240B).

3. heat resistance

It is measured by glass transition temperature (Dupont Model: 1090).

The more detailed description of the present invention in compliance with examples is as follows.

EXAMPLE 1

To 300 cc-autoclave 100 parts by weight of PMMA [Lucy Ltd., IH-830], 79 parts by weight of ammonium bicarbonate, 268 parts by weight of tetrahydrofuran (THF) and 268 parts by weight of methyl alcohol as a mixed solvent were added, and then the reaction mixture was agitated, with refluxing nitrogen for preventing oxidation.

Next, the reaction mixture was dissolved by agitating (250 rpm), reacted at 230° C. (inner pressure; 1470 psi) for 3 hours.

After the reation was completed, the solution of methacrylimide group containing polymer was precipitated in n-hexane, filtrated and dried sufficiently in vacuume oven at 100° C. for 3 hours, to obtain the polymer as a white powder.

The obtained polymer was measured with infrared spectrometer, to obtain the data of $1680m^{-1}$, $1700m^{-1}$ and $1720m^{-1}$ which were characteristic band of methacrylimide structure.

The material properties of the above mentioned polymer were represented in table 1.

EXAMPLE 2

Following the procedure of Example 1, except using 63 parts by weight of ammonium bicarbonate ($NH_4HCO_3$) as an imidizing agent, 340 parts by weight of tetrahydrofuran and 144 parts by weight of methyl alcohol as a mixed solvent and 810 psi of inner pressure, the polymer was obtained.

The material properties were represented is table 1.

EXAMPLE 3

Following the procedure of Example 1, except using 47 parts by weight of ammonium bicarbonate as an imidizing agent, 340 parts by weight of tetrahydrofuran and 144 parts by weight of methyl alcohol as a mixed solvent and 780 psi of inner pressure, the polymer was obtained.

The material properties were represented in table 1.

EXAMPLE 4

To 57% by weight of methylmethacrylate (MMA) was added 27% by weight of maleic anhydride (MAH), 16% by weight of styrene (ST), 0.2% by weight of t-dodecylmercaptan as a chain transfer agent, and then the mixture was polymerized in solution (ethylbenzene as solvent) at 145° C. for 2 hours, to obtain the polymer.

Following the procedure of the Example 1, 100 parts by weight of MMA-MAH-ST copolymer, 31 parts by weight of ammonium bicarbonate as an imidizing agent, 372 parts by weight of tetrahydrofuran 36 parts by weight of methyl alcohol as a mixed solvent, and 700 psi of inner pressure, to obtain the polymer.

The material properties of the polymer were represented in table 1.

EXAMPLE 5

Following the procedure of the Example 1, except using 100 parts by weight of ammonium bicarbonate as an imidizing agent, 536 parts by weight of tetrahydrofuran, to obtain the polymer.

The material properties of the polymer were represented in table 1.

COMPARATIVE EXAMPLE 1

To autoclave 100 parts by weight of PMMA and 340 parts by weight of tetrahydrofuran were added, and then gaseous ammonia was added to the reaction mixture in order to make inner pressure 700 psi, to obtain the polymer.

The material properties of the polymer were represented in table 1.

TABLE 1

|  | Examples | | | | | comparative examples |
|---|---|---|---|---|---|---|
|  | 1 | 2 | 3 | 4 | 5 | 1 |
| MMA polym | 100 | 100 | 100 | — | 100 | 100 |
| MMA-MAH-ST copolymer | — | — | — | 100 | — | — |
| ammonium bicarbonate ammonia (gas) | 79 | 63 | 47 | 31 | 79 | injection of ammonia to 700 psi of inner pressure |
| tetrahydrofuran | 268 | 340 | 340 | 372 | 536 | 340 |
| methyl alcohol | 268 | 144 | 144 | 36 | — | — |
| the degree of imidization (%) | 76 | 59 | 32 | 30 | 67 | 17 |

TABLE 1-continued

|  | Examples | | | | | comparative examples |
|---|---|---|---|---|---|---|
|  | 1 | 2 | 3 | 4 | 5 | 1 |
| glass transition temperature (°C.) | 211 | 187 | 161 | 156 | 197 | 137 |

MMA: methylmethacrylate monomer
MAH: maleic anhydride monomer
ST: styrene monomer

EXAMPLE 6

To autoclave 100 parts by weight of PMMA [Lucky Ltd., IH-830], 58 parts by weight of cyclohexyl amine as an imidizing agent, 100 parts by weight of distilled water as a reaction promoter, 456 parts by weight of tetrahydrofuran (THF) and 58 parts by weight of methyl alcohol as a mixed solvent were add, and then the reaction mixture was agitated, with sufficiently refluxing nitrogen for preventing oxidation. Next, the reaction mixture was dissolved by agitating (250 rpm), reacted at 200° C. for 3 hours. After the reaction was completed, the solution of methacrylimide group containing polymer was reprecipitated in n-hexane, filtrated and dried sufficiently in vacuume oven at 100° C., to obtain the polymer as a white powder. The obtained polymer was measured with infrared spectrometer, to obtain the data of $1680m^{-1}$, $1700m^{-1}$ which were characteristic bands of methacrylimide structure. The material properties of the above polymer were represented in table 2.

EXAMPLE 7

Following the procedure of the Example 6, except using 63 parts by weight of ammonium bicarbonate as an imidizing agent, 60 parts by weight of distilled water as a reaction promoter, 340 parts by weight of tetrahydrofuran and 146 parts by weight of methyl alcohol as a mixed solvent and 230° C. of a reaction temperature, to obtain the polymer. The material properties of the polymer were represented in table 2.

EXAMPLE 8

Following the procedure of the Example 8, except using 47 parts by weight of ammonium bicarbonate as an imidizing agent, 60 parts by weight of distilled water as a reaction promoter, 340 parts by weight of tetrahydrofuran and 146 parts by weight of methyl alcohol as a mixed solvent and 230° C. of a reaction temperature, to obtain the polymer. The material properties of the polymer were represented in table 2.

EXAMPLE 9

Following the procedure of the Example 6, except using 31 parts by weight of ammonium bicarbonate as an imidizing agent, 60 parts by weight of distilled water as a reaction promoter, 340 parts by weight of tetrahydrofuran and 146 parts by weight of methyl alcohol as a mixed solvent, 230° C. of a reaction temperature, to obtain the polymer. The material properties of the polymer were represented in table 2.

EXAMPLE 10

Following the procedure of the Example 6, except using 15 parts by weight of ammonium bicarbonate as an imidizing agent, 60 parts by weight of distilled water as a reaction promoter, 340 parts by weight of tetrahydrofuran and 146 parts by weight of methyl alcohol as a mixed solvent and 230° C. of a reaction temperature, to obtain the polymer. The material properties of the polymer were represented in table 2.

COMPARATIVE EXAMPLE 2

Following the procedure of the Example 6, except using 100 parts by weight of PMMA, 58 parts by weight of cyclohexyl amine as an imidizing agent, 456 parts by weight of tetrahydrofuran and 58 parts by weight of methyl alcohol, to obtain the polymer. The material properties of the polymer were represented in table 2.

COMPARATIVE EXAMPLE 3

Following the procedure of the Example 7, except using 100 parts by weight of PMMA, 63 parts by weight of ammonium bicarbonate as an imidizing agent, 340 parts by weight of tetrahydrofuran and 146 parts by weight of methyl alcohol, to obtain the polymer. The material properties of the polymer were represented in table 2.

COMPARATIVE EXAMPLE 4

Following the procedure of the Example 8, except using 100 parts by weight of PMMA, 47 parts by weight of ammonium bicarbonate as an imidizing agent, 340 parts by weight of tetrahydrofuran and 146 parts by weight of methyl alcohol, to obtain the polymer. The material properties of the polymer were represented in table 2.

COMPARATIVE EXAMPLE 5

Following the procedure of the Example 9, except using 100 parts by weight of PMMA, 31 parts by weight of ammonium bicarbonate as an imidizing agent, 340 parts by weight of tetrahydrofuran and 146 parts by weight of methyl alcohol, to obtain the polymer. The material properties of the polymer were represented in table 2.

COMPARATIVE EXAMPLE 6

Following the procedure of the Example 10, except using 100 parts by weight of PMMA, 15 parts by weight of ammonium bicarbonate as an imidizing agent, 340 parts by weight of tetrahydrofuran and 146 parts by weight of methyl alcohol, to obtain the polymer. The material properties of the polymer were represented in table 2.

COMPARATIVE EXAMPLE 7

Following the procedure of the Example 7, except using 100 parts by weight of PMMA, 63 parts by weight of ammonium bicarbonate as an imidizing agent, 25 parts by weight of distlled water 340 parts by weight of tetrahydrofuran and 146 parts by weight of methyl alcohol, to obtain the polymer. The material properties of the polymer were represented in table 2.

COMPARATIVE EXAMPLE 8

Following the procedure of the Example 7, except using 100 parts by weight of PMMA, 63 parts by weight of ammonium bicarbonate as an imiding agent, 250 parts by weight of distlled water 340 parts by weight of tetrahydrofuran and 146 parts by weight of methyl alcohol, to obtain the polymer. The material properties of the polymer were represented in table 2.

COMPARATIVE EXAMPLE 9

Following the procedure of the Example 7, except using 100 parts by weight of PMMA, 63 parts by weight of ammonium bicarbonate as an imidizing agent and 380 parts by weight of water, to obtain the polymer. The material properties of the polymer were represented in table 2.

EXAMPLE 13

27% by weight of maleic anhydride (MAH), 16% by weight of styrene (ST), 0.2% by weight of t-docecylmercaptan as a chain transfer agent were added to 57% by weight of methylmetlacylate (MMA), and then the reaction mixture was polymerized in solution (ethylbenzene as a solvent) at 145° C. for 2 hours, to obtain the polymer.

Following the procedure of the Example 11, except using 100 parts by weight of the obtained MMA-NAH-ST copoalymer, 44 parts by weight of ammonium bicarbonate as an imidizing agent, 10 parts by weight of tetramethylammonium hydroxide pentahydrate as an imidization reaction catalyst, 388 parts by weight of tetrahydrofuran and 46 parts by weight of methyl alcohol as a mixed solvent and 540 psi of inner pressure, to obtain the polymer. The material properties of the polymer were represented in table 3.

TABLE 2

|  | Examples | | | | | Comparative Examples | | | | | | | |
|---|---|---|---|---|---|---|---|---|---|---|---|---|---|
|  | 6 | 7 | 8 | 9 | 10 | 2 | 3 | 4 | 5 | 6 | 7 | 8 | 9 |
| MMA polymer | 100 | 100 | 100 | 100 | 100 | 100 | 100 | 100 | 100 | 100 | 100 | 100 | 100 |
| cylohexylamine | 58 | — | — | — | — | 58 | — | — | — | — | — | — | — |
| ammonium bicarbonate | — | 63 | 47 | 31 | 15 | — | 63 | 47 | 31 | 15 | 63 | 63 | 63 |
| distilled water | 100 | 60 | 60 | 60 | 60 | — | — | — | — | — | 25 | 250 | 250 |
| tetrahydrofuran | 456 | 340 | 340 | 340 | 340 | 456 | 340 | 340 | 340 | 340 | 340 | 340 | — |
| methyl alcohol | 58 | 146 | 146 | 146 | 146 | 58 | 146 | 146 | 146 | 146 | 146 | 146 | — |
| the degree of imidization (%) | 63 | 61 | 35 | 23 | 16 | 38 | 59 | 32 | 15 | 15 | 29 | *** | *** |
| glass transition temperature (°C.) | 81 | 190 | 169 | 146 | 137 | 174 | 187 | 161 | 134 | 125 | 158 | — | — |

***: The polymer coagulated around agitated axis, glass transition temperature of the polymer could not be measured.

EXAMPLE 11

To 1.8/-autoclave methylmethacrylate polymer [Lucky Ltd., IH-830], 39 parts by weight of ammonium bicarbonate as an imidizing agent, 9 parts by weight of tetramethyl ammonium hydroxide pentahydrate, 455 parts by weight of tetrahydrofuran and 55 parts by weight of methyl alcohol as a mixed solvent were added, and then the reaction mixture was dissolved by agitating (250 rpm), reacted at 210° C. of reaction temperature for 3 hours (inner pressure; 550 psi). After the reaction was completed, the solution of methylmethacrylimide group containing polymer was reprecipitated in n-hexane, filtrated and dried sufficiently in vacuume oven at 100° C. to obtain the polymer as a white powder.

The obtained polymer was measured with infrared spectrometer, to obtain the data of 1680 cm$^{-1}$, 1700 cm$^{-1}$ and 1720 cm$^{-1}$ which were characteristic bands of methacrylimide stucture. The material properties of the polymer were represented in table 3.

EXAMPLE 12

Following the procedure of the Example 11, except using 39 parts by weight of ammonium bicarbonate as an imidizing agent, 18.3 parts by weight of tetraethylammonium hydroxide (40% solution) as an imidization reaction catalyst, 455 parts by weight of tetrahydrofuran and 55 parts by weight of methyl alcohol as a mixed solvent and 210° C. of reaction temperature, to obtain the polymer. The material properties of the polymer were represented in table 3.

EXAMPLE 14

Following the procedure of the Example 11, except using 100 parts by weight of MMA-MAH-ST obtained in Example 13, 44 parts by weight of ammonium bicarbonate as an imidizing agent, 19 parts by weight of tetraethylammonium hydroxide (40% solution) as an imidization reaction catalyst, 388 parts by weight of tetrahydrofuran and 46 parts by weight of methyl alcohol as a mixed solvent and 560 psi of inner pressure, to obtain the polymer. The material properties of the polymer were represented in table 3.

COMPARATIVE EXAMPLE 10

Following the procedure of the Example 11, except using 100 parts by weight of methylmethacrylate, 39 parts by weight of ammonium bicarbonate as an imidizing agent, 455 parts by weight of tetrahydrofuran and 55 parts by weight of methyl alcohol as a mixed solvent, 210° C. of reaction temperature and 500 psi of inner pressure, to obtain the polymer. The material properties of the polymer were represented in table 3.

COMPARATIVE EXAMPLE 11

Following the procedure of the Example 11, 100 parts by weight of MMA-MAH-ST copolymer obtained in Example 13, 44 parts by weight of ammonium bicarbonate as an imidizing agent, 382 parts by weight of tetrahydrofuran and 46 parts by weight of methyl alcohol as a mixed solvent, 500 psi of inner pressure, to obtain the poeymer. The material properties of the polymer were represented in table 3.

TABLE 3

|  | Examples | | | | Comparative Examples | |
| --- | --- | --- | --- | --- | --- | --- |
|  | 11 | 12 | 13 | 14 | 10 | 11 |
| MMA polymer | 100 | 100 | — | — | 100 | — |
| MMA-MAH-ST copolymer | — | — | 100 | 100 | — | 100 |
| ammonium bicarbonate | 39 | 39 | 44 | 44 | 39 | 44 |
| tetramethylammonium hydroxide pentahydrate | 9 | — | 10 | — | — | — |
| tetraethylammonium hydroxide (40% solution) | — | 18.3 | — | 19 | — | — |
| tetrahydrofuran | 455 | 455 | 388 | 388 | 455 | 388 |
| methyl alcohol | 55 | 55 | 46 | 46 | 55 | 46 |
| the degree of imidization (%) | 5.55 | 8.39 | 34.2 | 34.2 | 2.64 | 31.6 |
| N content (%) | 0.755 | 1.125 | 2.83 | 2.93 | 1.365 | 2.225 |
| glass transition temperature (%) | 125 | 128 | 162 | 162 | 119 | 157 |

EXAMPLE 15

To 1.8l-autoclave 100 parts by weight of methylmethacrylate polymer [Lucky Ltd., IH-830], 14 parts by weight of methylamine as an imidizing agent, 7 parts by weight of tetramethylammonium hydroxide pentahydrate as a catalyst, 19 parts by weight of distilled water, 455 parts by weight of tetrahydrofuran and 55 parts by weight of methyl alcohol as a mixed solvent were added, and then the reaction mixture was dissolved by agitating (250 rpm), reacted at 170° C. for 3 hours (inner pressure; 550 pis). After the reaction was completed, the solution of methylmethacrylimide group containing polymer was reprecipitated in n-hexane, filtrated and dried sufficiently in vacuume oven at 100° C. to obtain the polymer as a white powder. The obtained polymer was measured with infrared spectrometer, to obtain the data of 1680 cm$^{-1}$ 1700 cm$^{-3}$ and 1720 cm$^{-1}$ which were characteristic bands of methymethacrylimide structure. The material properties of the above polymer were represented in table 4.

EXAMPLE 16

Following the procedure of the Example 15, except 190° C. of reaction temperature, to obtain the polymer. The material properties of the polymer were represented in table 4.

EXAMPLE 17

Following the procedure of the Example 15, except 210° C. of reaction terperature, to obtain the polymer. The material properties of the polymer were represented in table 4.

COMPARATIVE EXAMPLE 12

Following the procedure of the Example 15, except not using catalyst and 170° C. of reaction temperature, to obtain the polymer. The material properties of the polymer were represented in table 4.

COMPARATIVE EXAMPLE 13

Following the procedure of the Example 15, except not using catalyst and 190° C. of reaction temperature, to obtain the polymer. The material properties of the polymer were represented in table 4.

COMPARATIVE EXAMPLE 14

Following the procedure of the Example 15, except not using catalyst and 210° C. of reaction temperature, to obtain the polymer. The material properties of the polymer were represented in table 4.

TABLE 4

|  | Examples | | | Comparative Examples | | |
| --- | --- | --- | --- | --- | --- | --- |
|  | 15 | 16 | 17 | 12 | 13 | 14 |
| MMA polymer | 100 | 100 | 100 | 100 | 100 | 100 |
| methyl amine | 14 | 14 | 14 | 14 | 14 | 14 |
| tetramethyl ammonium hydroxide pentahydrate | 7 | 7 | 7 | — | — | — |
| water | 19 | 19 | 19 | 19 | 19 | 19 |
| tetrahydrofuran | 455 | 455 | 455 | 455 | 455 | 455 |
| methyl alcohol | 55 | 55 | 55 | 55 | 55 | 55 |
| the degree of imidization (%) | 13.3 | 17.5 | 23.8 | 4.7 | 9.8 | 21.6 |
| N content (%) | 1.71 | 2.19 | 2.87 | 0.63 | 1.28 | 2.64 |
| glass transition temperature (%) | 129 | 134 | 140 | 117 | 123 | 138 |

EXAMPLE 18

To 1.8/-autoclave 100 arts by weight of sufficiently dried methylmethacrylate polymer [Lucky Ltd., IH-830], 57 parts by weight of anhydrous cyclohexyl amine as an imidizing agent, 8.2 parts by weight of tetramethylammonium hydroxide pentahydrate (25% in methanol) as a catlyst, 455 parts by weight of anhydrous tetrahydrofuran and 55 parts by weight of anhydrous methyl alcohol were added, and then the reaction mixture was dissolved by agitating (250 rpm) for preventing oxidation, reacted at 190 for 3 hours (inner pressure; 250 psi). After the reaction was completed, the solution of methylmethacrylimide group containing polymer was reprecipitated in n-hexane, filtrated and dried sufficiently in vacuume oven at 100° C., to obtain the polymer as a white powder. The obtained polymer was measured with infrared spectrometer, to obtain the data of 1680 cm$^{-1}$, 1700 cm$^{-1}$ and 1720 cm$^{-1}$ which were characteristic bands of methylmethacrylimide structure. The material properties of the polymer were represented in table 2.

EXAMPLE 19

Following the procedure of the Example 18, except using 100 parts by weight of sufficiently dried methylmethacrylate polymer [Lucky Ltd., IH-830], 37 parts by weight of anhydrous propylamine as an imidizing agent, tetramethyl ammonium hydroxide (25% in methanol) as a catalyst, 455 parts by weight of anhydrous tetrahydrofuran and 55 parts by weight of anhydrous methyl alcohol as a solvent, 190° C. (inner pressure; 300 psi) of a reaction temperature, to obtain the polymer. The material properties of the polymer were represented in table 5.

EXAMPLE 20

27% by weight of maleic anhydride (MAH), 16% by weight of styrene, 0.2% by weight of t-dodecylmercaptan were added to 57% by weight of methlmethacrylate (MMA), and then the reaction mixture was polymerized in solution (ethylbenzene as a solvent), to obtain the copolymer.

Following the procedure of the Example 18, except using 100 parts by weight of completely dried MMA-MAH-ST copolymer, 68 parts by weight of anhydrous cyclohexyl amine as an imidizing agent, 6.9 parts by weight of tetramethyl ammonium hydroxide, 46 parts by weight of anhydrous methyl alcohol and 190° C. (inner pressure; 260 psi) of a reaction temperature, to obtain the polymer. The material properties of the polymer were represented in table 5.

EXAMPLE 21

Following the procedure of the Example 18, except using 100 parts by weight of completely dried MMA-MAH-ST obtained in Example 20, 41 parts by weight of anhydrous propyl amine as an imidizing agent, 6.9 parts by weight of as a catalyst, 382 parts by weight of anhydrous tetrahydrofuran and 46 parts by weight of anhydrous methyl alcohol as a solvent, and 190° C. (inner pressure; 300 psi) of a reaction temperature, to obtain the polymer. The material properties of the polymer were represented in table 5.

EXAMPLE 22

Following the procedure of the Example 18, except 210° C. (inner pressure; 400 psi) of to obtain the polymer. The material properties of the polymer were represented in table 5.

EXAMPLE 23

Following the procedure of the Example 19, 210° C. (inner pressure; 450 psi) of a reaction temperature, to obtain the polymer. The material properties of the polymer were represented in table 5.

EXAMPLE 24

Following the procedure of the Example 20, except 210° C. (inner pressure; 450 psi) a reaction temperature, to obtain the polymer. The material properties of the polymer were represented in table 5.

EXAMPLE 25

Following the procedure of the Example 21, except 210° C. (inner pressure; 450 psi) of a reaction temperature, to obtain the polymer. The material properties of the polymer were represented in table 5.

COMPARATIVE EXAMPLES 15~22

Following the procedure of the Example 18~25, except not using catalyst, to obtain the polymer. The material properties of the polymer were represented in table 5.

TABLE 5

| | Examples | | | | | | | |
|---|---|---|---|---|---|---|---|---|
| | 18 | 19 | 20 | 21 | 22 | 23 | 24 | 25 |
| MMA polymer | 100 | 100 | — | — | 100 | 100 | — | — |
| MMA-MAH-ST copolymer | — | — | 100 | 100 | — | — | 100 | 100 |
| propyl amine | — | 37 | — | 41 | — | 37 | — | 41 |
| cyclohexyl amine | 57 | — | 68 | — | 57 | — | 68 | — |
| tetramethyl amonium hydroxide (in 25% methanol) | 8.2 | 8.2 | 6.9 | 6.9 | 8.2 | 8.2 | 6.9 | 6.9 |
| tetrahydrofuran | 455 | 455 | 382 | 382 | 455 | 455 | 382 | 382 |
| methyl alcohol | 55 | 55 | 46 | 46 | 55 | 55 | 46 | 46 |
| reaction temperature (%) | 190 | 190 | 190 | 190 | 210 | 210 | 210 | 210 |
| reaction time (h) | 3 | 3 | 3 | 3 | 3 | 3 | 3 | 3 |
| N content (%) | 1.13 | 3.15 | 2.80 | 2.69 | 3.55 | 3.50 | 4.05 | 3.96 |
| the degree of imidization(%) | 9 | 28 | 33.2 | 35.3 | 38 | 32 | 47.3 | 36.9 |
| glass transition temperature (°C.) | 137 | 133 | 169 | 141 | 168 | 138 | 184 | 142 |

| | Comparative Examples | | | | | | | |
|---|---|---|---|---|---|---|---|---|
| | 15 | 16 | 17 | 18 | 19 | 20 | 21 | 22 |
| MMA polymer | 100 | 100 | — | — | 100 | 100 | — | — |
| MMA-MAH-ST copolymer | — | — | 100 | 100 | — | — | 100 | 100 |
| propyl amine | — | 37 | — | 41 | — | 37 | — | 41 |
| cyclohexyl amine | 57 | — | 68 | — | 57 | — | 68 | — |
| tetramethyl amonium hydroxide (in 25% methanol) | — | — | — | — | — | — | — | — |
| tetrahydrofuran | 455 | 455 | 382 | 382 | 455 | 455 | 382 | 382 |
| methyl alcohol | 55 | 55 | 46 | 46 | 55 | 55 | 46 | 46 |
| reaction temperature (%) | 190 | 190 | 190 | 190 | 210 | 210 | 210 | 210 |
| reaction time (h) | 3 | 3 | 3 | 3 | 3 | 3 | 3 | 3 |
| N content (%) | 1.12 | 2.28 | 2.62 | 2.55 | 3.15 | 3.32 | 3.49 | 3.40 |
| the degree of imidization(%) | 8 | 19 | 31.2 | 32.5 | 32 | 30 | 44.5 | 32.7 |
| glass transition temperature (°C.) | 134 | 128 | 166 | 139 | 163 | 134 | 181 | 140 |

We claim:

1. A process for the preparation of heat resistant and transparent acrylic resins comprising reacting an acylic resin with an imidizing material comprising a compound selected from the group consisting of ammonia, primary amines and compounds capable of liberating ammonia or primary amines upon decomposition under reaction conditions, in the presence of 1–20% by weight of the acrylic resin and imidizing material of water and 0.01–15% by weight of the acrylic resin and imidizing material of a compound of the formula (IV) as a catalyst:

$$R_4NOH \qquad (IV)$$

wherein $R_4$ represents an unsubstituted or substituted $C_1$–$C_{20}$ alkyl cycloalkyl, aryl, aralkyl, allyl or mixtures thereof, at a temperature of 100° to 350° C. in a solvent.

2. The process according to claim 1, wherein the acrylic resin is a methylmethacrylate polymer or methylmethacylate-ethylenic unsaturated monomer copolymer.

3. The process according to claim 2, wherein the methylmethacrylate-ethylenic unsaturated monomer copolymer comprises more than 50% by weight of the copolymer of methlmethacrylate structural units.

4. The process according to claim 1, wherein the primary amine is the compound of the following formula (III)

$$R\ NH_2 \qquad (III)$$

wherein R represents a hydrogen atom, unsubstituted and substituted $C_1$–$C_{20}$ alkyl cycloalkyl, aryl, aralkyl, alkaryl, allyl or mixtures thereof.

5. The process according to claim 1, wherein the compounds capable of generating primary amine are urea, 1,3-dimethyl urea, 1,3-diethyl urea, ammonium acetate, an ammonium bicarbonate of the following formula (II)

$$RNH_3HCO_3 \qquad (II)$$

wherein R represents a hydrogen atom, unsubstituted or substituted $C_1$–$C_{20}$ alkyl, cycloalkyl, aryl, aralkyl, allyl or mixtures thereof, or their derivatives.

6. The process according to claim 1, wherein the solvent is selected from the group consisting of benzene, toluene, xylene, methylethylketone, ethylenglycol dimethylether, diglyme, dioxane, tetrahydrofuran, dimethylformamide, dimethyl sulfoxide, dimethylacetamide, methyl alcohol, ethyl alcohol, isopropyl alcohol, butyl alcohol or mixtures thereof, the solvent having a boiling point in the range of 50° to 160° C.

7. The process according to claim 1, the reaction product is a compound of the following formula (I) comprising more than 5% by weight of the copolymer of imidized structural unit $$\text{(I)}$$

wherein $R_1 R_2$, and $R_3$ independently represents a hydrogen atom, unsubstituted and substituted $C_1$–$C_{20}$ alkyl cycloalkyl, aryl, aralkyl, alkaryl, allyl or mixtures thereof.

8. A process for the preparation of a heat resistant and transparent acrylic resin comprising reacting an acrylic resin with an imidizing material comprising ammonium carbonates of the formula (II)

$$RNH_3HCO_3 \qquad (II)$$

wherein R represents a hydrogen atom, unsubstituted or substituted $C_1$ to $C_{20}$ alkyl, cycloalkyl, aryl, aralkyl, allyl or mixtures thereof or derivatives thereof generating a primary amine in the presence of 0.01–15% by weight of the acrylic resins and imidizing material of a catalyst compound of the formula (IV)

$$R_4NOH \qquad (IV)$$

wherein R represents unsubstituted or substituted $C_1$ to $C_{20}$ alkyl, cycloalkyl, aryl, aralkyl, alkaryl, allyl or mixtures thereof at a temperature of 100° to 350° C. in a solvent.

9. The process according to claim 8, wherein the acrylic resin is a methylmethacrylate polymer or a methylmethacrylate-ethylenic unsaturated monomer copolymer.

10. The process according to claim 9, wherein the methylmethacrylate-ethylene unsaturated monomer copolymer comprises more than 50% by weight of the copolymer of methylmethacrylate structural unit.

11. The process according to claim 8, wherein the solvent is selected from the group consisting of benzene, toluene, xylene, methylethylketone, ethylenglycol dimethylether, diglyme, dioxane, tetrahydrofuran, dimethylformamide, dimethyl sulfoxide, dimethylacetamide, methyl alcohol, ethyl alcohol, isopropyl alcohol, butyl alcohol and mixtures thereof, the solvent having a boiling point in the range of 50° to 160° C.

12. The process according to claim 8, the reaction product is a compound of the following formula (I) comprising more than 5% by weight of the copolymer of imidized structural unit $$\text{(I)}$$

wherein $R_1$, $R_2$ and $R_3$ independently represents a hydrogen atom, unsubstituted and substituted alkyl $C_1$ to $C_{20}$ cycloalkyl, aryl, aralkyl, alkaryl, allyl or mixtures thereof.

* * * * *